May 31, 1932. H. GORANSON ET AL 1,861,084
FRUIT PEELING MACHINE
Filed Aug. 25, 1928 7 Sheets-Sheet 3
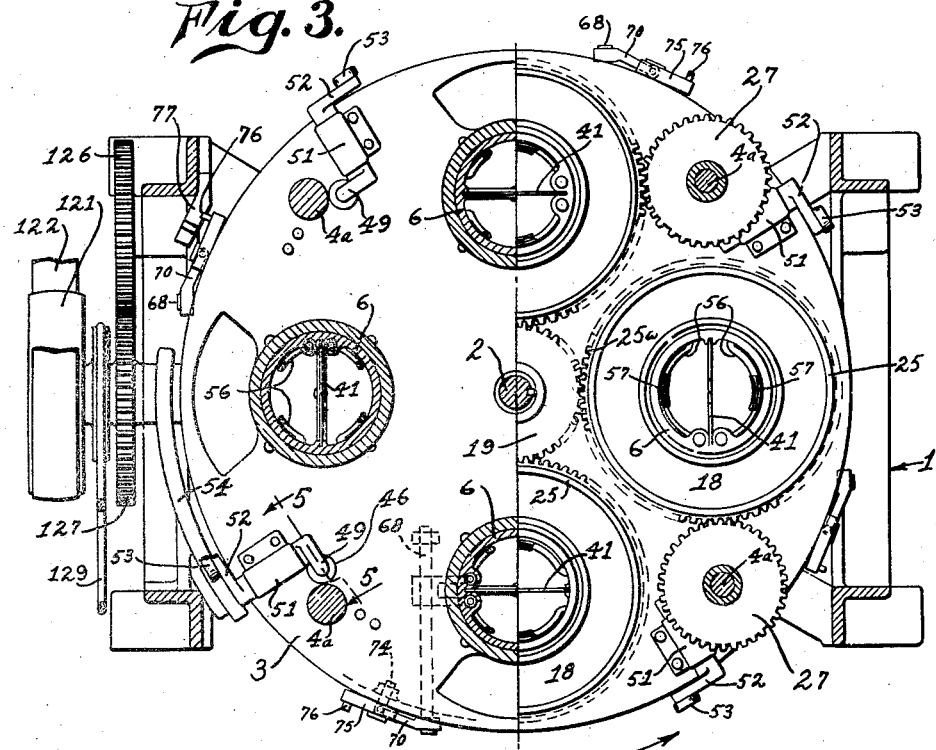
Fig. 3.
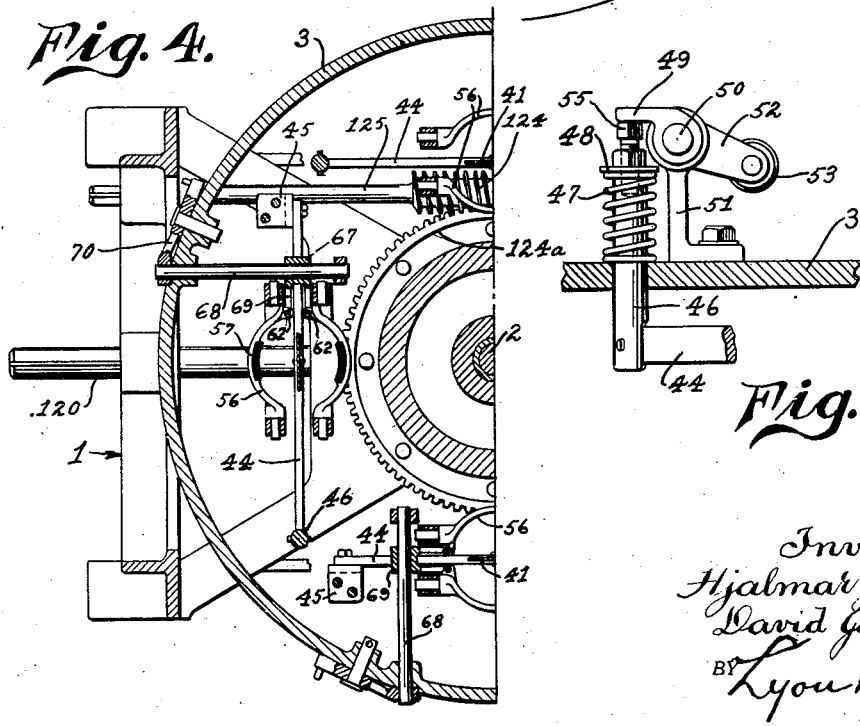
Fig. 4.
Fig. 5.
Inventors
Hjalmar Goranson
David Goranson
BY Lyon & Lyon
ATTORNEYS May 31, 1932. H. GORANSON ET AL 1,861,084
FRUIT PEELING MACHINE
Filed Aug. 25, 1928  7 Sheets-Sheet 4

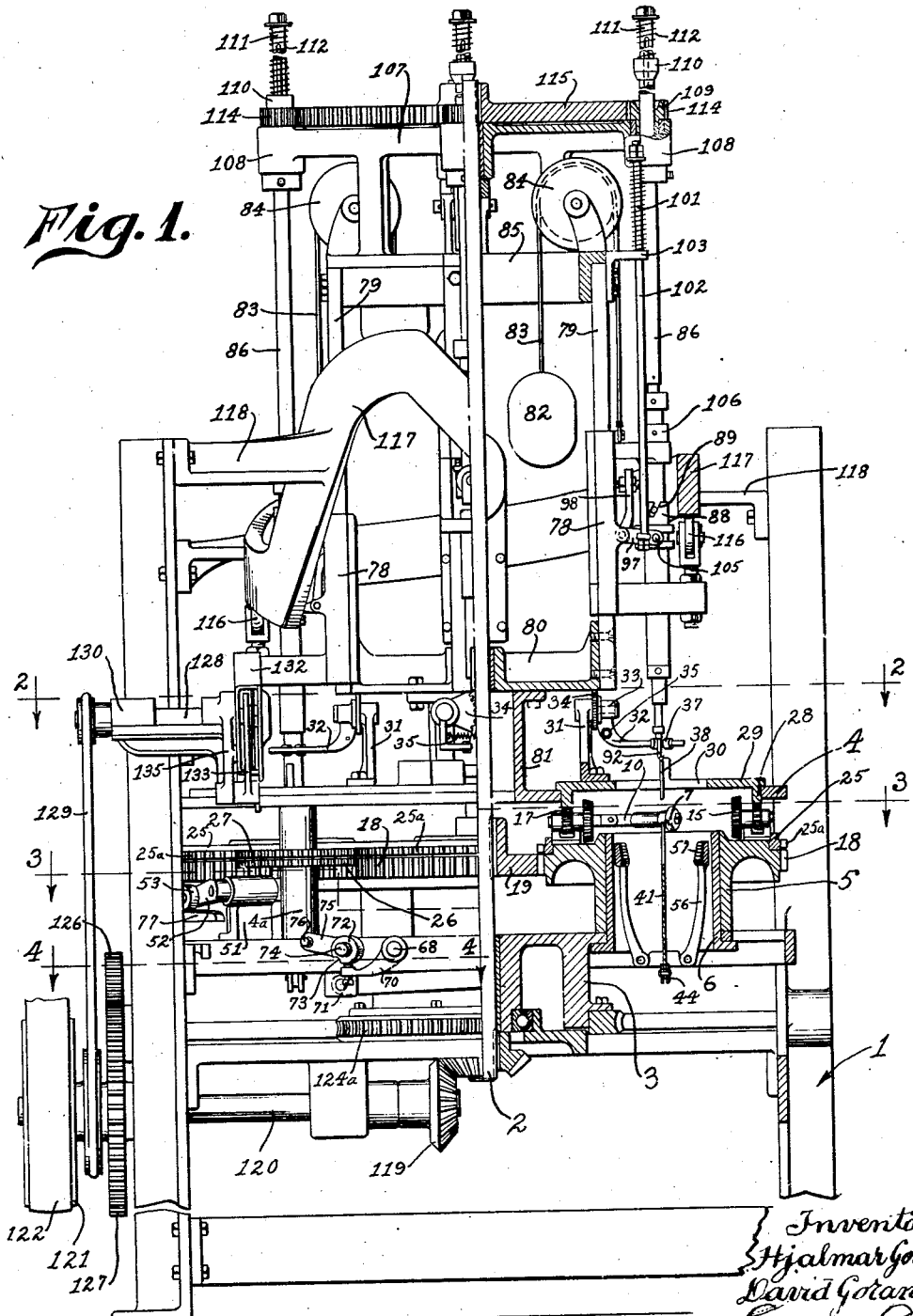

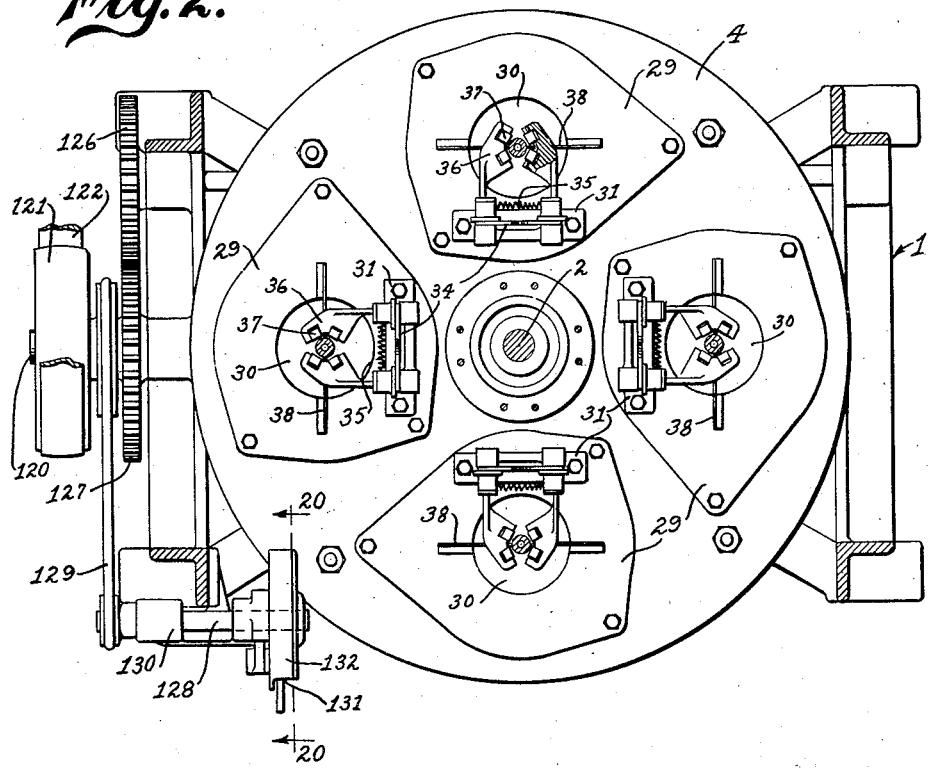
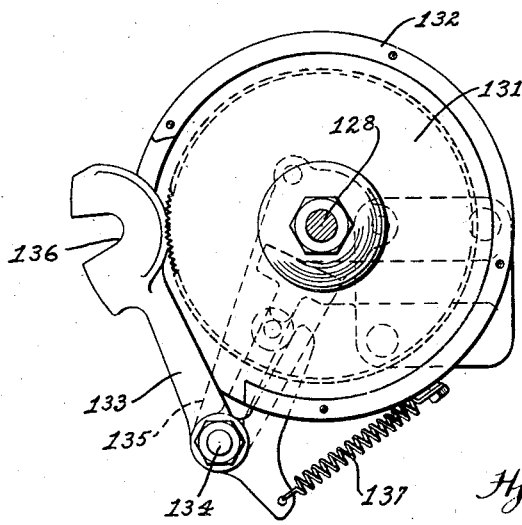

Inventors
Hjalmar Goranson
David Goranson
BY Lyon+Lyon attys

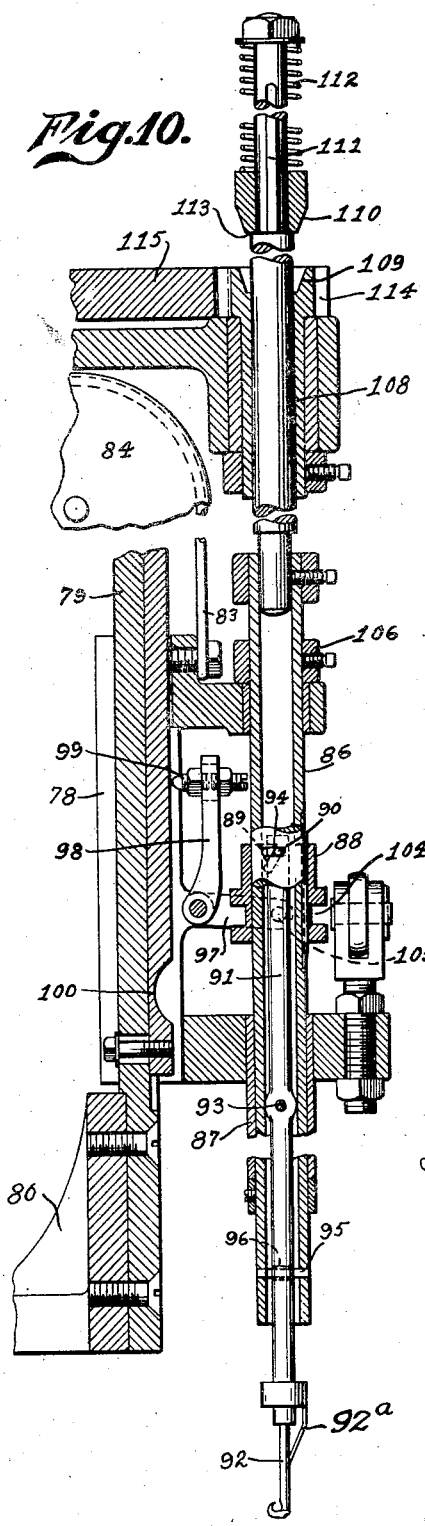

May 31, 1932.  H. GORANSON ET AL  1,861,084
FRUIT PEELING MACHINE
Filed Aug. 25, 1928  7 Sheets-Sheet 6
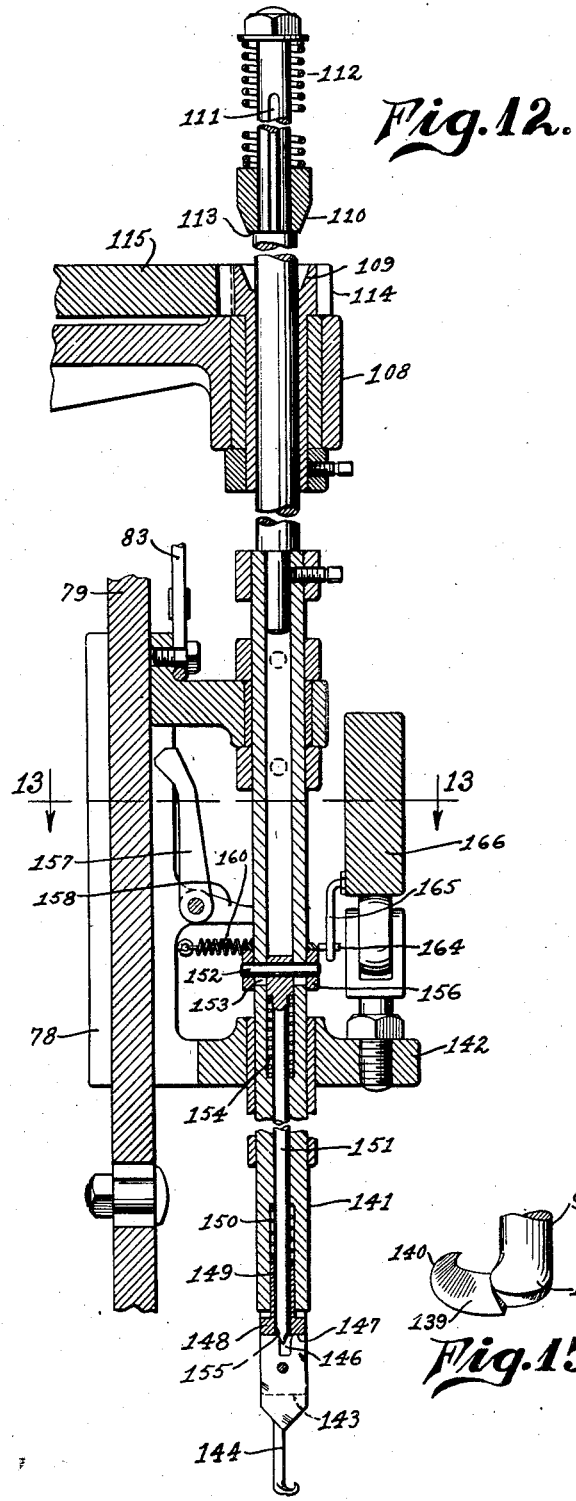
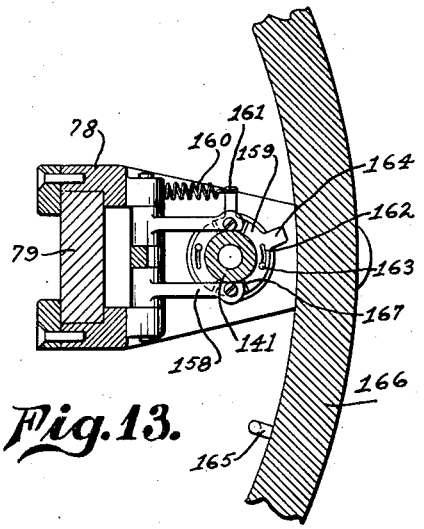
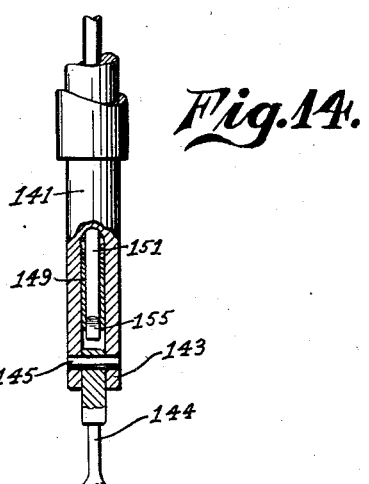
Inventors
Hjalmar Goranson
David Goranson
BY
ATTORNEYS

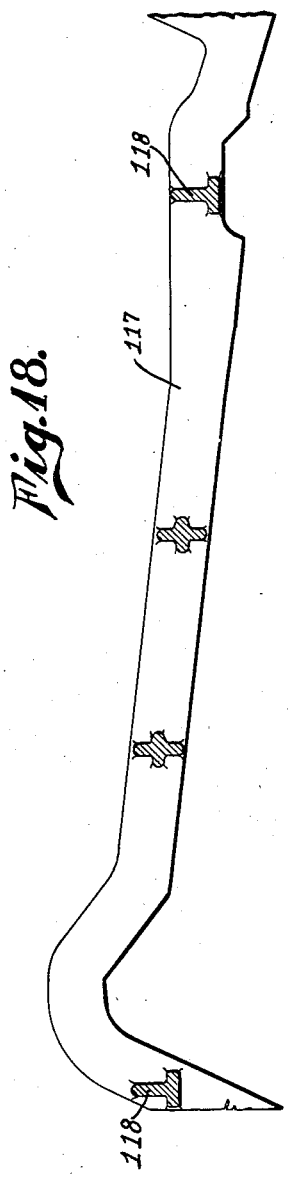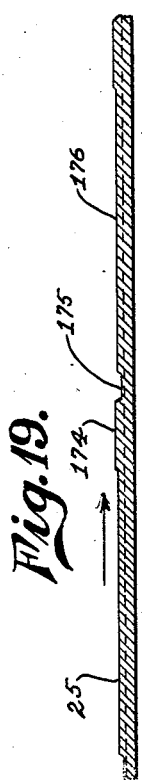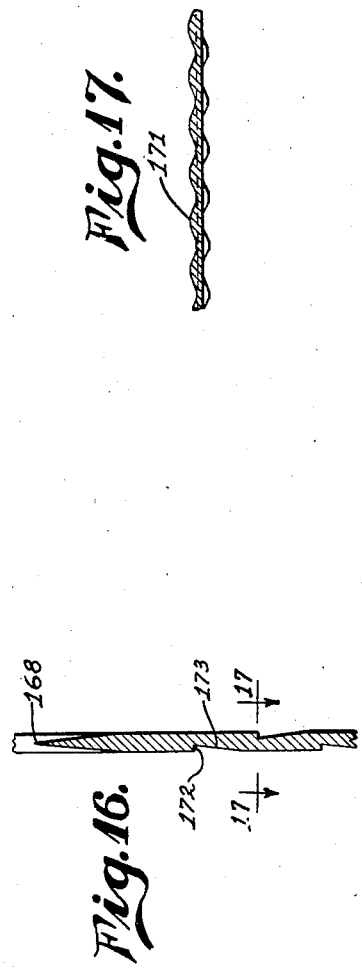

Patented May 31, 1932

1,861,084

UNITED STATES PATENT OFFICE

HJALMAR GORANSON AND DAVID GORANSON, OF SAN JOSE, CALIFORNIA, ASSIGNORS TO CALIFORNIA PACKING CORPORATION, OF SAN FRANCISCO, CALIFORNIA, A CORPORATION OF NEW YORK

FRUIT PEELING MACHINE

Application filed August 25, 1928. Serial No. 302,042.

This invention relates to a machine for peeling fruit or vegetables. While many features of the invention can be applied in machines for peeling fruit of any shape, the invention is particularly applicable in the construction of a machine for peeling fruit of elongated shape, such as pears.

The general object of the invention is to provide a machine of this kind which will operate automatically to effect the peeling of the fruit, and which will operate in such a way as to effect the peeling of the end of the fruit, that is to say, in peeling a pear, the machine will completely peel the flower end of the pear.

One of the objects of the invention is to provide automatic means for coring the fruit; also to provide improved means for centering and guiding the fruit as it passes through or past the peeling mechanism.

Another object of the invention is to produce a coring tool of simple construction, which is so constructed that it expands automatically when its end has penetrated to the center of the fruit, so as to effect the coring of the fruit by removing as little as possible of the body of the fruit.

A further object of the invention is to improve the general construction of machines of this type.

A further object is to provide simple means for cutting off the end of the fruit preparatory to placing it in the machine to be automatically peeled.

Further objects of our invention will appear hereinafter.

The invention consists in the novel parts and combination of parts to be described hereinafter, all of which contribute to produce an efficient fruit peeling machine.

A preferred embodiment of the invention is described in the following specification, while the broad scope of the invention is pointed out in the appended claims.

In the drawings, Figure 1 is a view showing one-half of the machine in side elevation, and the other half in vertical section, certain parts being broken away.

Figure 2 is a horizontal section through the machine, taken about on the line 2—2 of Figure 1, and particularly illustrating the guiding and holding means that guides the fruit as it passes forward or down to the peeling mechanism.

Figure 3 is a horizontal section taken about on the line 3—3 of Figure 1, and particularly illustrating the mechanism for guiding and holding the fruit, and which cooperates with the coring tool.

Figure 4 is a horizontal section taken about on the line 4—4 of Figure 1, and further illustrating the mechanism illustrated in Figure 3; it also illustrates the controlling mechanism for the parts illustrated in Figure 3.

Figure 5 is a vertical section taken about on the line 5—5 of Figure 3, and further illustrating details of the controlling mechanism, certain parts being broken away.

Figure 9 is a vertical section taken about on the line 9—9 of Figure 7, certain parts being broken away, and further illustrating details of the mechanism shown in Figure 7. In this view details of the face of the guide plate are omitted.

Figure 10 is a vertical section taken on the axis of the coring stem and showing the mounting for the same, including the carriage that supports the stem; this view also shows a portion of the frame and a clutch mechanism for rotating the coring tool, and the means for expanding the same.

Figure 11 is a cross section taken on the line 11—11 of Figure 9, but upon a greatly enlarged scale.

Figure 12 is a view similar to Figure 10, but showing another embodiment of the coring tool.

Figure 13 is a horizontal section taken about on the line 13—13 of Figure 12, and further illustrating this embodiment of the coring tool.

Figure 14 is a side elevation in partial section of the coring tool, showing the same as viewed in a plane substantially at right angles to the plane in which Figure 12 is taken.

Figure 15 is a side elevation showing the lower end of the coring tool, the upper portion of the coring tool being broken away.

Figure 16 is a vertical section taken through the guide plate which constitutes a feature of the guiding and holding means for holding the fruit when it is being cored. In this view the lower portion of the plate is broken away.

Figure 17 is a horizontal section taken about on the line 17—17 of Figure 16, and further illustrating details of the construction of the guide plate shown in Figure 16.

Figure 18 is a developed side elevation of the main cam of the machine that controls the movements of the carriages that carry the pusher that advances the fruit past the peeling mechanism, and which, in the present embodiment of the invention, also controls the advance of the coring tool with relation to the fruit.

Figure 19 is a longitudinal section of another cam, developed. This cam controls the operation of the peeling knives.

Figure 20 is a section taken about on the line 20—20 of Figure 2, and particularly illustrating details of means provided for cutting off one end of the fruit preparatory to introducing it into the machine.

Figure 6:
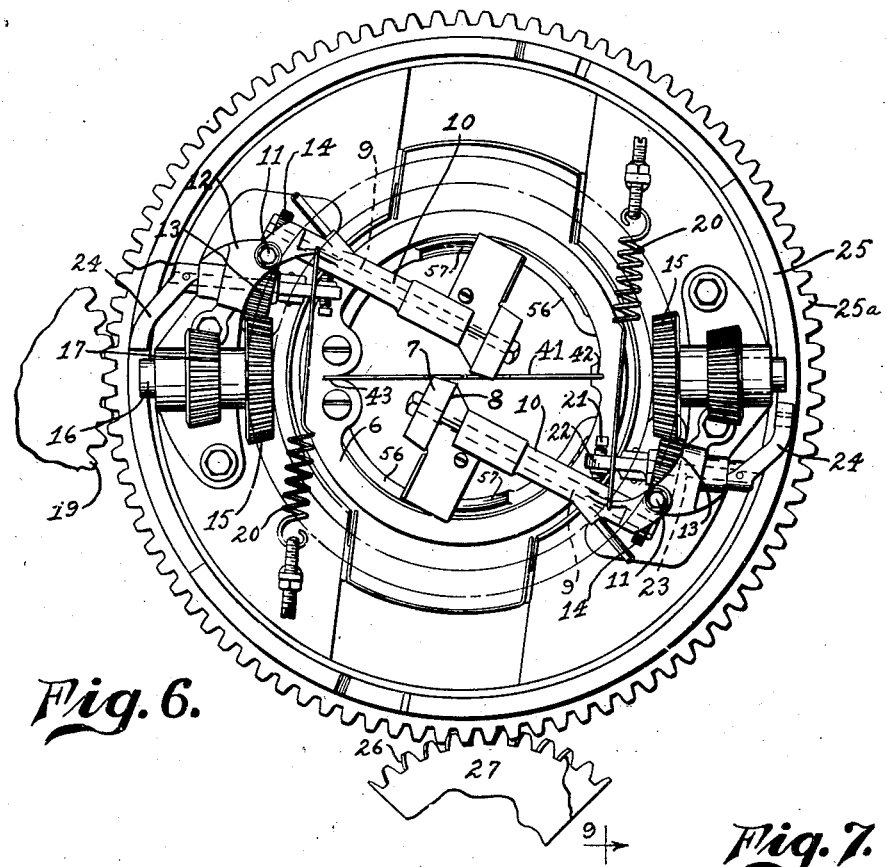
Figure 6 is a plan of one of the peeling units or peeling mechanism upon an enlarged scale, certain parts being broken away; this view also indicates the driving means and the controlling mechanism for the peeling knives.
Figure 8:
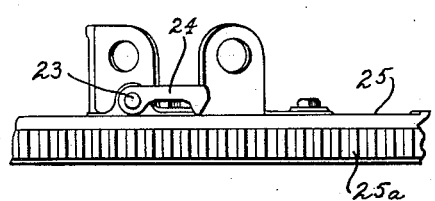
Figure 8 is a side elevation and is a fragmentary view showing a portion of the controlling mechanism for the peeling knife.

Before proceeding to a detailed description of the machine, it should be stated that this machine is of the general construction of the machine disclosed in our former application Serial No. 170,126.

Referring more particularly to the parts, and especially to Figure 1, 1 represents the frame of the machine which frame carries a vertical central shaft 2, that passes up through a lower rotary table 3 and an upper rotary table 4, the upper table being connected with the lower table by vertical posts 4ª which, in the present instance, are four in number (see Figure 3). In the operation of the machine, these tables 3 and 4 rotate in unison, and they support the peeling and coring mechanism which is automatically controlled as the tables rotate to effect the peeling and coring of the fruit.

The machine is preferably constructed with a plurality of peeling units. In the present instance, there are four of these units, each of which includes a rotary turntable or carriage 5 (see Figures 1 and 6). Each peeling rotary carriage 5 is rotatably mounted on a fixed tubular arbor or sleeve 6, which is rigidly mounted in the lower table 3 (see Figure 1) and on the upper face of each rotary carriage 5 the peeling cutters or knives 7 are supported. These knives are preferably cone shaped, presenting annular cutting edges 8, which engage the fruit, and each knife 7 is carried on a driven shaft 9, which is mounted in a movable knife arm 10. Each of these knife arms is mounted to swing on a vertical pivot bolt 11 supported on a bracket 12. This bracket carries a gear wheel 13 that meshes with the gear wheel 14 on the outer end of the shaft 9, the construction being such that the gears 13 and 14 maintain themselves in mesh while permitting a limited swinging movement of the cutter arms 10 on their pivots 11.

The gear wheel 13 is driven by a gear wheel 15 carried on a shaft 16, which also rigidly carries a beveled gear 17, through which the gears 15 and 13 are driven when the carriage rotates. The carriage 5 is formed at its edge with gear teeth 18, so that it virtually constitutes a gear wheel. These gear teeth mesh with a central driving gear 19 (see Figure 1), which is rigidly carried on the central shaft 2.

Referring again to the cutter arms 10, and particularly to Figure 6, each of these arms is pulled inwardly toward the fruit by means of a coiled spring 20, which holds the arm against an adjustable stop 21, carried on an arm 22, which projects up from a shaft 23, the outer end of said shaft being provided with an arm 24, the function of which is to control the position of the stop 21 to regulate the distance of the cutting edges of the knives 7 from the axis of the fruit. For this purpose the arm 24 rests upon the upper face of a cam ring 25, which ring is mounted to rotate concentrically on the carriage 5. Each cam 25 is rotated on the axis of the carriage but at a different speed from the carriage, and we utilize this different speed of rotation or relative movement of the cam and carriage to enable the cam to be utilized to control the knife arms. In the present instance, we drive these cams slightly faster than the carriages. In order to accomplish this, we provide each post 4ª with a gear wheel 26, which, in the present instance, has forty-two teeth, and this gear wheel is rigid with a gear wheel 27 just above it (see Figure 1), which, in the present instance, has forty-three teeth. This upper gear wheel 27 meshes with the gear teeth 25ª carried on the edge of the cam ring 25. In this way the cam ring is driven at a slightly greater speed than the carriage.

The character of this cam is illustrated in Figure 19. It is provided with elevated faces and depressed faces which will be described more in detail hereinafter, and which cause the lever 24 to impart movement to the stops 21 (see Figure 6), thereby moving the peeling knife 7 toward or away from the fruit, as may be necessary to facilitate the peeling operation.

As the tables 3 and 4 rotate, the peeling knife shafts 9 are rotated through the medium of the beveled pinion 17 that meshes with the gear wheel 28 (see Figure 1), which extends downwardly from a cover plate 29 that is mounted in an opening in the upper table 4. This cover plate has a central opening 30, through which the fruit passes downwardly to move it past the peeling mechanism. In this connection it should be understood that the fixed gear wheel 28 is concentric with the axis of the sleeve 6, which, of course, is the axis on which the carriage 5 rotates.

The machine is provided with guiding and holding means for the fruit that engages the fruit and holds it with its axis substantially coinciding with the axis of the peeling mechanism, that is to say, the axis around which the peeling knives rotate. The machine also includes guiding and holding mechanism for the fruit located beyond the peeling mechanism.

In the operation of the machine, after the fruit passes out of contact with the upper or outer holding and guiding mechanism, it is held and guided by the second or lower guiding mechanism in such a way that the upper end of the fruit, that is to say, the rear end of the fruit with respect to the direction of advance, is left exposed, so that the knives can peel the end of the fruit. In the case of a pear, this would be the flower end.

We will now describe our novel holding and guiding means that receives the fruit and guides it as it moves toward the peeling mechanism. For this purpose the upper face of the cover plate 29 is provided with suitable means, such as two brackets 31 (see Figures 1 and 2). These brackets support guide jaws disposed on opposite sides of the fruit and these guide jaws are connected together in such a way that they maintain themselves equidistant from the axis of the fruit as they yieldingly separate to permit the fruit to pass them. In this way they guide the fruit, at the same time centering it with its axis on the axis of the peeling mechanism. This guiding and centering means consists of two arms 32 supported on horizontal pivots 33 carried, respectively, on the brackets 31. Each arm 32 is rigid with a sector or gear segment 34, and these segments mesh together so that whatever outward or inward rotation of one arm takes place, this rotation would be imparted to the opposite arm. The arms 32 are constrained to swing toward each other by means of a coiled spring 35 that connects them. These arms are extended downwardly below their pivots 33 and each arm is formed into a jaw 36 with two rollers 37, the axes of which form an angle with each other. As the fruit is forced downwardly between the jaws, it will be evident that these rollers will guide the fruit and maintain it in a central position.

Cooperating with guide arms 32 the cover plate 29 is provided with two impaling blades 38 which are attached at their outer ends to the cover plate 29 and project toward each other. They lie in a plane passing through the axis of the peeling mechanism and their inner edges 39 are disposed slightly apart so as to form a gap 40. As the fruit passes downwardly, these impaling blades cut into diametrically opposite sides of the fruit and hold it against rotation. At the same time they do not extend far enough into the fruit to cut into its core. In this way the body of the fruit is left sufficiently intact to hold it firmly while the peeling knives are peeling the lower end of the fruit as it progresses downwardly below the lower edges of the impaling blades 38.

The lower holding and guiding means for the fruit preferably includes a guide plate 41, which we call a center plate. This guide plate it located in a vertical plane coinciding substantially with the plane of the impaling blades 38, so that as the fruit descends, the upper edge of this blade has a relative movement into the fruit along the axis of the fruit. The side edges of this center plate 41 are guided to slide in slots 42 and 43 on the inner face of the arbor or tubular sleeve 6. This plate cooperates with the coring tool, as will be described hereinafter, to enable the coring tool to penetrate the fruit from above (see Figure 9), so that the lower end of the coring tool will move into the center of the fruit where the seeds are located.

In order to enable this plate 41 to be depressed at a certain stage in the peeling operation so as to depress the fruit to permit the upper end of the fruit to be accessible to the peeling knives, this center plate is supported at 44ª on a lever 44 (see Figures 4 and 9). This lever is pivotally supported at one end on a bracket 45 attached to the under side of the lower table 3. In order to control the operation of this lever automatically, its free end is pivotally attached to a plunger 46 (see Figure 5), which is guided to slide vertically through the lower table 3. This plunger is normally held elevated by a coiled spring 47 thrusting against a collar 48 at its upper end. The free end of this lever is located near the edge of the table and is depressed automatically in the cycle of operation of the machine by a toe 49 carried on a rock shaft 50 mounted on a bracket 51 and carrying a rigid arm 52 with a roller 53 on its end. As the tables 3 and 4 rotate, this cam roller rolls on a cam 54 (see Figure 3), and thereby depresses the lever. For the purpose of adjustment, the upper end of the plunger 46 is provided with an adjusting bolt 55 against which the toe 49 thrusts.

Cooperating with the center plate 41 to hold the fruit when its upper end is being peeled and when the coring tool is removing the core, we provide a pair of presser members 56 (see Figure 7) mounted in each of the sleeves or tubular mandrels 6. Each of these presser members has an elevated curved jaw 57 to engage the side of the fruit and the body of the member is in the form of an upwardly extending bow, the lower end of each bow terminating in a fork or arm 58 which is mounted on a pivot 59 adjacent the lower end of the mandrel 6. This pivot pin is supported on a pin 60 secured in a lug 61 extending down from the lower end of the sleeve or mandrel 6.

Figure 7:
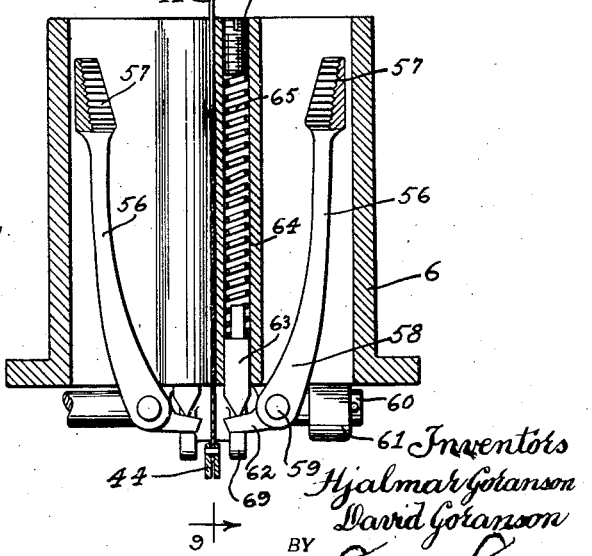
Figure 7 is a vertical section through the guiding and holding means for the fruit, certain parts being broken away.

We provide means for urging the presser members so as to move them in against the side of the fruit, and we provide means for controlling the amount of inward movement that is permitted to them. In this way it should be understood the jaws will not be pressed too firmly against the sides of the fruit. In order to accomplish this, we provide the forks 58 at one side with an inwardly projecting toe 62. In Figure 4, it will be seen that the toes from the opposite presser members lie opposite to each other and project toward the plane of the center plate 41. As indicated in Figure 7, each toe 62 is normally pressed down by a plunger 63 mounted in a chamber 64 formed in the wall of the sleeve 6, and this plunger is pressed down by a coiled spring 65 which thrusts at its upper end against a screw plug 66 mounted in the upper end of the bore. At a proper moment in the cycle of the machine, these toes are pressed upwardly to swing the presser members 56 on their pivot pins 59 and move their jaws 57 away from the center plate. In order to accomplish this, we provide a rock lever 67 (see Figure 4) secured to a rock shaft 68 and this rock lever has two forks 69 which extend respectively under the toes 62. The shaft 68 extends over to the outer edge of the lower table 3, at which point it is provided with a rigid arm 70 the end of which is provided with an adjusting bolt 71 which is held by the spring 65 against the under side of a cam 72. This cam 72 has a notch or depression 73 in its face which may come opposite to the bolt or stud 71 to permit an upward movement of the end of the arm 70 so as to permit a downward movement of the forks 69 which would permit the jaws 57 to approach the center plate. The cam 72 is mounted to rock (see Fig. 1) on a pin 74 projecting outwardly from the side of the table 3 and carries a short arm 75 with an outwardly projecting pin 76. This pin 76, during the rotation of the tables 3 and 4, engages a cam 77 (see Figure 3) to actuate the cam 72.

In the operation of the machine, after the fruit is placed by the operator between the jaws 36, an automatic pusher engages the upper end of the fruit and forces it down past the peeling mechanism. For this purpose we provide a vertically guided carriage 78 (see Figure 10) corresponding to each peeling mechanism. This carriage is simply a slide which slides up and down on a guide 79 which is bolted to a spider 80 mounted on an extension 81 in the form of a hub that extends upwardly at the center of the upper table 4 (see Figure 1). This carriage 78 is counterbalanced by a counterweight 82 attached to a cord 83 secured to the upper end of the carriage and passing up and around a pulley 84 supported on a crown ring 85 bolted to the upper ends of the guides 79. Each carriage 78 carries a coring spindle or a stem 86 of tubular form which revolves in a tubular bushing 87. The coring tool is preferably of an expansible type, that is to say, it is constructed so that it can pass into the fruit in an unexpanded condition and when the tip of the coring tool arrives at the center of the fruit, it is automatically expanded and rotated so as to core the fruit, whereupon it automatically becomes unexpanded again and then withdraws from the fruit. In this way the coring tool removes merely a sufficient amount of the body of the fruit to remove the core. In order to accomplish this, we provide a collar 88 which is mounted to slide on the coring stem 86, and the upper portion of this collar is provided with two inclined grooves 89. These grooves are diametrically opposite to each other, and each groove is engaged by a pin 90 that projects outwardly from the upper end of a bar 91 located within the tubular coring stem 86 and which constitutes the handle of the coring tool 92.

The bar 91 is mounted to rock on a pivot 93 near its middle point, this pivot being in the form of a cross pin extending diametrically across the tubular stem 86. Opposite the pins 90 the wall of the tubular stem is provided with slots or openings 94 to permit the pins 90 to pass through to engage with the slots 89.

In order to guide the lower end of the bar 91, we provide the lower end of the coring stem 86 with a diametrically disposed pin 95 (see Figure 10) and this pin passes through a corresponding opening 96 in the bar. The connection between the pin 95 and the opening 96 is a free one, so as to permit the bar to move from its normal central position at one side over to its coring position at the other side, as indicated in Figure 10.

In order to give the collar 88 this longitudinal movement in an upward direction to shift the upper end of the bar 91 laterally, we provide the carriage 78 with a rock lever 97 (see Figure 10) having a rigid arm 98 extending upwardly, and this arm 98 is provided with an adjusting screw 99, the point of which rests against the forward face of the slide 79. When the carriage descends during the coring movement to move the coring tool into the center of the fruit, the tip of the adjusting screw 99 passes into a cam recess 100 in the face of the slide 79, and this permits a coiled spring 101 to pull up on a stem 102 that is attached to the horizontal arm of the rock lever 97. This spring 101 is located at the upper portion of the machine and thrusts against the upper side of a guide bracket 103, through which the upper end of the stem 102 extends. In other words, the tip of the adjusting screw 99 resting as it does normally against the forward face of the guide 79, holds the spring 101 in a state of compression. When the collar 88 is in a more depressed position on the stem 86, than that in which it is represented in Figure 10, and the adjusting screw 99 arrives at the dip or recess 100, the spring 101 pulls the rock lever 97 upwardly, thereby elevating the collar 88 and expanding the coring tool. The lower portion of the collar 88 has an annular groove 104 that is engaged by pins 105 extending in from the forks of the horizontal arm of the rock lever 97, it being understood that this arm would be in the usual form of forks to cooperate with a slip collar.

The coring stem 86 is provided with a collar 106 (see Figure 1) which enables the carriage 78 to raise and lower the stem, at the same time permitting the stem to rotate in the carriage when this becomes necessary. In this connection, however, it should be understood that the coring tool 92 operates as a pusher to push the fruit forwardly into the peeling mechanism without rotation while the peeling mechanism is removing the peel, and it is only when the coring operation is to take place that the coring tool penetrates the fruit. We provide automatic means for rotating the coring stem automatically as it penetrates into the fruit. For this purpose we provide an automatic clutch which rotates the coring stem only when the carriage 78 is in its most depressed position. In order to accomplish this, the upper end of the frame of the machine is in the form of a crown plate 107 having rotatably mounted bushings 108 in its edge, which correspond to each stem. In other words, each coring stem passes through one of these bushings. The upper end of the bushing is constructed so that it will operate as a clutch member. In the present instance, the upper end of each bushing 108 has a conical recess 109 in its upper side to enable it to cooperate with a conical clutch member 110 carried on the stem normally in a position elevated somewhat above the bushing.

The collar 110 is connected by a spline connection 111 with the upper end of the stem, and is normally held down by a coiled spring 112 against a shoulder 113 on the upper end of the stem. When the coring stem is depressed, this cone 110 seats in the conical recess 109 and has rotation imparted to it by the bushing 108 which is continuously rotated. In order to continuously rotate the bushings 108, the upper end of each bushing is formed with gear teeth 114, so that its upper end constitutes a pinion and these pinions mesh with a large gear 115 seating on the crown plate 107 and attached to the upper end of the center shaft 2.

The carriages 78 are automatically controlled in their up and down movements in the manner described in our former applications, that is to say, each carriage is provided with a roller 116 which engages the lower edge of an annular cam 117, which is concentric with the axis of the shaft 2 and is secured to the main frame of the machine by means of suitable brackets 118. In the present instance these brackets are cast integral with the cam.

The shaft 2 is driven continuously through beveled gears 119 (see Figure 1), one of which is carried on a horizontal shaft 120, which extends to the outside of the frame and carries a belt pulley 121 driven by a belt 122. This drives the shaft 2 at a relatively high speed.

In order to drive the tables 3 and 4 at a relatively low speed, the lower table 3 is provided with a rigid worm gear 124$^a$ which meshes with a worm 124 carried on a worm shaft 125. This worm shaft carries a gear wheel 126 at one end that meshes with the gear wheel 127 carried on the pulley shaft 120, already referred to.

In Figures 2 and 20, we illustrate a severing device for cutting off the stem end of the fruit before placing it in the machine. This device includes a shaft 128 which may be driven at a high speed through a belt 129 driven from the belt shaft 120. This shaft 128 is mounted in a bracket 130 secured on the frame at an elevated position, so as to be within convenient reach of the operator. The shaft 128 carries a rotary knife 131 in the form of a disc, the edge of which projects through an opening at the side of the knife housing 132. Opposite this opening a guide arm 133 is pivotally mounted at 134 on the end of a fixed bracket arm 135. The upper end of this arm has a socket 136 in which the stem end of the fruit can be inserted. A coiled spring 137 normally holds this guide arm 133 in its extreme outermost position. By pressing the fruit into the socket, the arm will swing inwardly and guide the end of the fruit into contact with the edge of the cutter disc 131. This will enable the operator to sever the end of the fruit without danger to himself from the cutter disc.

In Figure 15, we illustrate the preferred form of the lower end of the cutter tool proper 92. The lower end of this cutter is preferably expanded to produce a pusher foot 138, and this foot is provided with a laterally projecting coring knife 139 which is preferably in the form of a hooked blade having a curved cutting edge 140 on its lower side. It should be understood that in Figure 15 the view shows this tool in magnified size.

In Figures 12, 13 and 14, we illustrate another embodiment of the coring tool stem, which involves the use of a different combination or organization of parts for controlling the expansion of the coring tool. In other respects, the operation of the coring tool is identical with the coring tool already described. As illustrated in these figures, we provide a coring stem 141, which is of tubular form and mounted so that it is capable of rotation in the carriage 142. The lower end of this coring stem 141 is cut away so as to form two forks 143 with a throat between them, in which the upper end of the coring tool 144 is mounted to rock on a cross pin 145. The upper end of the coring tool is in the form of a block (see Figure 12) with a slot 146 in its upper edge 147. This transverse edge 147 normally receives the thrust of a presser head 148, which has an integral sleeve 149 extending up into the lower end of the coring stem 141 and urged downwardly by a coiled spring 150. The action of the spring 150 is to hold the coring tool yieldingly in a plumb position. Within the sleeve 149 a longitudinally movable controlling stem 151 is provided, the upper end of which is provided with a cross pin 152 which can move up and down in diametrically opposite slots 153 in the wall of the stem 141.

The controlling stem 151 is normally held elevated by a coiled spring 154. The lower end of the controlling stem 151 has a tapered tip with an inclined cam edge 155 that is capable of passing down into the slot 146. When the carriage 142 has descended to bring the end of the coring tool to the center of the fruit, the controlling stem 151 is forced downwardly by means of a collar 156 that carries the ends of the pin 152. This collar is forced downwardly by means of a bell crank lever 157 similar to the bell crank lever 97 already described. The bell crank lever 157 has a pair of forks 158 (see Figure 13) which engage the upper side of the collar at diametrically opposite points.

These forks, however, do not engage directly with the collar 156 but press down against a cam washer or collar 159 which is rotatably mounted on the coring stem 141 and seats on the upper face of the collar 156. The function of this collar 159 is to rotate on the axis of the coring stem and thereby retract the controlling stem 151 just before the coring tool withdraws from the fruit. In other words, the movement of this cam collar 159 permits the coring tool to resume its unexpanded condition while in the fruit just before it withdraws. This cam collar 159 is normally held in a predetermined position by a coiled spring 160, one end of which is secured to the carriage 142 and the other end of which is attached to a radial arm 161 projecting from the cam collar.

A circumferential slot 162 cooperating with a small screw 163 in the upper face of the collar 156 limits the movement of this cam collar under the action of the spring 160. In the operation of the machine, the cam collar 159 is automatically engaged to produce this rotation. For this purpose the cam collar 159 is provided with a short radial arm 164 and this arm comes into the path of a trigger 165 (see Figures 12 and 13) that projects down from the inner face of the main cam 166. In Figure 13 this mechanism is shown in a phase of the cycle in which the coring stem has just moved in the direction of the arrow past the trigger 165. In this connection, it should be understood that when the short arm 164 strikes the trigger 165, a small amount of clockwise rotation is imparted to the cam collar 159. This will move an elevated part of the cam located at the point 167 under its corresponding fork 158. At this point there would be a depression which would permit an upward movement of the collar 156. This movement will be sufficient to enable the pusher collar 148 to return the coring tool to its plumb position but thrusting against its upper end face 147.

We shall now describe more in detail the preferred construction of the center plate 41. This plate is illustrated in detail in Figures 16 and 17 and also in Figure 9. Its upper edge is preferably cut so as to form a gap re-entrant angle or throat such as indicated, the bottom 169 of this throat or gap being located on the middle line of the plate and in line with the axis of the peeling mechanism, that is to say, this bottom edge 169 is at a point on the line of progress of the fruit that would lie on the axis of the fruit when the fruit 170, indicated in Figure 9, is passing downwardly through the sleeve 6.

The edge 168 of this plate is sharpened to a cutting edge and the plate is preferably provided with corrugations 171 extending vertically on the plate. This plate is provided with means for engaging the fruit to pull it downwardly when the plate 41 is depressed in the manner referred to above. In order to attain the effect of projections on the face of the plate for this purpose, we provide the plate with transverse grooves 172 alternately on opposite sides of the plate, which grooves cut into the "waves" or corrugations of the plate so as to form abrupt shoulders at the upper edges of the grooves. The bottoms of the grooves are inclined faces 173. With this construction it will be evident that the sides of the corrugations will present abrupt shoulders which will tend to pull the fruit downwardly when the plate 41 is depressed. In this operation the presser members 56 cooperate by pressing the halves of the fruit against the sides of the plate.

Referring again to the cam ring 25 which is shown in developed form in Figure 19, it will be noted that the cam has an elevated face 174, the function of which is to hold the cutter arms 10 widely separated from each other at the time that the fruit is being cored. In other words, this part of the cam swings the peeler arms 10 apart so as to permit the coring tool to pass down through the gap 40 and into the U-shaped notch formed in the edge 168.

The depressed face 175 of this cam permits the peeling knives to approach very near each other as they must do in peeling the flower end of the pear. In this connection it should be understood that the direction of movement of the lever 24 relative to the cam is indicated by the arrow in Figure 19, as the last peeling operation is the peeling of the flower end after which the coring takes place. The elevated cam face 176 is not always in contact with the lever 24. When the lever is passing over this portion of the cam, the peeling knives will be forced outwardly by the cheek of the fruit. In other words, the cutters can swing outwardly in an unrestricted manner under the action of the pressure of the fruit, but they are limited in their inward movement at all times by the stop bolts 21 (see Figure 6), controlled by the cam.

The coring tool 92 (see Figure 10) has an inclined knife portion 92a that operates to cut out the "flower" of the fruit when the end of the coring tool is removing the core of the fruit.

In the mode of operation of the machine the small end of the fruit is introduced into the space between the guide jaws 36 (see Figure 2) with the axis of the fruit vertical. As the tables 3 and 4 rotate, the main cam 117 operates to depress the carriage 78 and move the stem 86 downwardly. In this movement of the stem 86 the foot 138 of the coring tool 92 operates as a pusher. As it pushes the fruit down, the jaws 36 yieldingly move outwardly extending the spring 35, but maintain themselves equidistant from the axis of the fruit. This keeps the axis of the fruit in alignment with the peeling mechanism. As the fruit descends, its opposite sides are cut into by the impaling blades 38 which project from opposite sides of the cover plate 29. (See Figure 1.) These impaling blades hold the fruit against rotation as it is moved downwardly through the opening 30 of the cover plate. As the lower end of the fruit comes into the plane of rotation of the knives 7, the peel is removed progressively from the lower end of the fruit upwardly. As the fruit descends it forces the cutter arms 10 apart; that is to say, they swing outwardly on their pivots 11 (see Figure 6) being held yieldingly against the face of the fruit by the coiled springs 20.

As the fruit moves downwardly its lower end is engaged on its axis by the center plate 41 which is located on the axis of the fruit. The fruit is shoved downwardly by the pusher to such an extent that its flower end is located about in the plane of rotation of the knives 7; then the pusher withdraws and the knives finish the peeling of the flower end. As the knives peel the flower end, the fruit is still held intact by its core. The fruit descends slightly at this time by reason of a slight downward movement of the corrugated cutter plate 41. The notches 172 assist in pulling the fruit down. After the flower end is peeled the jaws 57 move in to grasp the fruit while it is being cored. This movement is permitted by a rocking movement of the rock shaft 68 actuated by the arm 70 (see Figure 3) controlled by cam 75 and pin 76 cooperating with cam 77 (see Figure 3). The rocking of the rock shaft 68 rocks the toes or forks 69 downwardly (see Figure 7) and this permits the spring 65 to act. After the jaws 57 have been moved inwardly against the fruit to clamp its sides and press them against the sides of the center plate 41, the centerplate is moved downwardly. This is accomplished by the depression of the plunger 46 (see Figure 3).

Just before the knives move in to peel the flower end, the stem 86 is withdrawn by the main cam 117. After the flower end of the fruit has been completely peeled, the cam 25 operates to separate the knives 7 through the agency of the arm 24 (see Figure 6) and the arm 22 and adjustable stop 21. This is to enable the coring tool to descend for the coring operation. The downward movement of the coring tool for this purpose is, of course, produced by the main cam 117 co-operating with the carriage 78. In the downward movement of the coring tool, the fruit is held fixed by pressure of the jaws 57 which hold it against the center plate 41. As the coring stem 86 descends it pushes the coring tool down into the fruit through the flower end (see Figure 9) and near the end of the downward movement the cone clutch composed of the members 109 and 110 (see Figure 10) causes a rotation of the coring stem 86. However, just as this rotation takes place, the carriage will have descended to such an extent that the end of the adjusting screw 99 will have entered the depression 100. This will enable the spring 101 (see Figure 1) to pull up on the stem 102 and this will raise the collar 88 and cause its inclined slots 89 to rock the coring bar 91 on its pivot 93, thereby moving the lower end of the coring tool 92 to one side. This will produce an enlarged cavity in the center of the fruit and completely remove the core. The cam 117 will now permit the coring stem 86 to rise to withdraw the coring tool from the fruit. As this takes place the coring tool first moves into its unexpanded or central position, so that as it withdraws it does not remove any more of the body of the fruit than is necessary to effect the coring.

As the coring tool descends, it passes into the deep notch or re-entrant angle 168 formed in the upper edge of the plate 41, as indicated in Figure 9.

It is understood that the embodiment of the invention described herein is only one of the many embodiments this invention may take, and we do not wish to be limited in the practice of the invention, nor in the claims, to the particular embodiment set forth.

While we have described the notch at 169 as being of U-shape, it is obvious that if desired this notch can be of V-shape. The U-shape, however, is advantageous because it enables the center plate 41 to extend in closely to the heart of the fruit being cored.

What we claim is:

1. In a fruit peeling machine, the combination of holding and guiding means for the fruit, peeling mechanism, means for advancing the fruit past the peeling mechanism, a stem having an expansible coring cutter, means for relatively advancing the stem longitudinally to bring the coring cutter substantially to the center of the fruit, and means for rotating the coring cutter and for controlling the holding and guiding means to hold the fruit while the coring cutter is in operation, and automatic means for expanding the coring cutter after it has penetrated the fruit.

2. In a fruit peeling machine, the combination of a coring stem, means for advancing the coring stem along its own longitudinal axis, means for holding the fruit with its axis substantially coinciding with the longitudinal axis of said stem, said coring stem having a coring cutter at its forward end to penetrate to the center of the fruit, means for rotating the coring stem on its longitudinal axis, and means for expanding the coring cutter to enlarge the cavity produced by the same at the center of the fruit.

3. In a fruit peeling machine, the combination of a coring stem, means for advancing the same longitudinally on its own axis, a guide plate for the fruit disposed substantially in the plane of the said axis, means for relatively advancing the fruit along the said axis so that the said guide plate penetrates the fruit on its longitudinal axis, pressers located on opposite sides of the plate for clamping the halves of the fruit against the same, a coring cutter carried on the end of the stem, and means for rotating the coring stem when in an advanced position to core the fruit.

4. In a machine of the kind described, the combination of a center plate having a substantially U-shaped notch in one edge, means for relatively advancing the fruit and holding the same so that the center plate enters the fruit on the axis of the fruit with the vertex of the said U-notch disposed substantially on the axis of the fruit, a coring stem with means for guiding and relatively advancing the same along the axis of the fruit and substantially in the plane of said center plate, and a coring cutter carried by the coring stem.

5. In a machine of the kind described, the combination of a center plate having a substantially U-shaped notch in its edge, means for relatively advancing the fruit and holding the same so that its longitudinal axis substantially coincides with the vertex of the U-shaped notch and with the plane of said center plate so that the center plate enters the fruit in the plane of the axis of the fruit, a coring stem located substantially in the plane of the center plate and in line with the vertex of the said U-shaped notch, a coring cutter carried by the stem, means for relatively advancing the stem to project the coring cutter into the fruit, means for rotating the stem to core the fruit, and holding means located on opposite sides of the center plate for holding the fruit against the same.

6. In a machine of the kind described, the combination of a center plate having a substantially U-shaped notch in its edge, holding means on each side the plate for holding the fruit on the plate, with the plate located substantially on the axis of the fruit, a coring stem located substantially in the plane of the center plate and in line with the vertex of said U-shaped notch, a coring cutter having a joint connecting the same with the stem, means for advancing the stem on its longitudinal axis to move the coring cutter into the fruit, means for rotating the stem, and means cooperating with the said joint for controlling the position of the coring cutter to enlarge the cavity produced by the coring cutter at the center of the fruit.

7. In a fruit peeling machine, the combination of a plate having a gap in its edge, means for supporting the fruit and giving the same and said plate a relative movement to position the fruit on the plate with the plate substantially coinciding with the axis of the fruit, a coring tool, and means for advancing the same into the fruit along the axis of the same so that the coring tool passes into the said gap to core the fruit.

8. In a fruit peeling machine, the combination of a plate having a gap in its edge, means for supporting the fruit and for giving the same and said plate a relative movement to position the fruit on the plate with the plate substantially coinciding with the axis of the fruit, a coring tool and means for advancing the same into the fruit along the axis of the same so that the coring tool passes into the said gap to core the fruit, and means for pressing the sides of the fruit against the sides of the plate.

9. In a fruit peeling machine, the combination of a plate having a gap in its edge, means for supporting and guiding the fruit with its axis located on a line substantially in the plane of said plate and extending into said gap, a stem with means for guiding the same to move longitudinally along said line and toward said plate, a coring tool carried by the stem constructed to engage the fruit and push the same forward, presser means for cooperating with the plate to press the sides of the fruit, and actuating means for the stem operating first to push the fruit onto the plate without entering the fruit, and operating thereafter to advance the coring tool into the fruit while it is held by the said presser means.

10. In a fruit peeling machine, the combination of a plate having a gap in its edge, means for supporting the fruit and for giving the same and said plate a relative movement to position the fruit on the plate with the plate substantially coinciding with the axis of the fruit, a coring tool and means for advancing the same into the fruit along the axis of the same so that the coring tool passes into the said gap to core the fruit, means for pressing the sides of the fruit against the sides of the plate, said coring tool being expansible, and mounted on the stem so that it is capable of a lateral movement with respect to the axis of the stem, and means for giving the coring tool said lateral movement and for rotating the stem to core the fruit.

11. In a fruit peeling machine, the combination of a frame, a plate supported on said frame, means for supporting and guiding the fruit with its axis located on a line substantiallly in the plane of said plate, a carriage guided on said frame to move toward and from the said plate, a stem rotatably mounted on the carriage with its axis located substantiallly in the plane of said plate, a coring tool carried by the stem constructed to engage the fruit to push the same forward, presser means to cooperate with the plate to press the sides of the fruit to hold the same on the plate and means for moving the carriage toward the plate to enable the coring tool to push the fruit onto the plate and thereafter operating to advance the carriage with a further movement to cause the coring tool to cooperate with the pressure means so as to penetrate the fruit and core the same.

12. In a fruit peeling machine, the combination of a frame, a plate supported on said frame, means for supporting and guiding the fruit with its axis located on a line substantially in the plane of said plate, a carriage guided on said frame to move toward and from the said plate, a stem rotatably mounted on the carriage with its axis located substantially in the plane of said plate, a coring tool carried by the stem constructed to engage the fruit to push the same forward, presser means to cooperate with the plate to press the sides of the fruit to hold the same on the plate, and means for moving the carriage toward the plate to enable the coring tool to push the fruit onto the plate and thereafter operating to advance the carriage with a further movement to cause the coring tool to cooperate with the pressure means so as to penetrate the fruit and core the same, said coring tool being expansible, and automatic means for expanding the coring tool after it has penetrated the fruit.

13. In a fruit peeling machine, the combination of a frame, a plate supported on said frame, means for supporting and guiding the fruit with its axis located on a line substantially in the plane of said plate, a carriage guided on said frame to move toward and from the said plate, a stem rotatably mounted on the carriage with its axis located substantially in the plane of said plate, a coring tool carried by the stem constructed to engage the fruit to push the same forward, presser means to cooperate with the plate to press the sides of the fruit to hold the same on the plate and means for moving the carriage toward the plate to enable the coring tool to push the fruit onto the plate and thereafter operating to advance the carriage with a further movement to cause the coring tool to cooperate with the pressure means so as to penetrate the fruit and core the same, and automatic means for rotating the stem while the coring tool is within the fruit.

14. In a fruit peeling machine, the combination of a frame, peeling mechanism, means for supporting and guiding the fruit along a line extending past the peeling mechanism, holding means for holding the fruit located beyond the peeling mechanism, a carriage guided on the frame to move substantially along the said line, a stem mounted on the carriage with its axis located substantially on said line, a coring tool carried on said stem, means for moving the stem along its axis to push the fruit into engagement with said holding means, and for giving the stem and coring tool a further advancing movement after the fruit is held by the holding means to cause the coring tool to penetrate the fruit, and means for rotating the stem to core the fruit.

15. In a fruit peeling machine, the combination of a frame, peeling mechanism, means for supporting and guiding the fruit along a line extending past the peeling mechanism, holding means for holding the fruit located beyond the peeling mechanism, a carriage guided on the frame to move substantially along the said line, a stem mounted on the carriage with its axis located substantially on said line, a coring tool carried on said stem, means for moving the stem along its axis to push the fruit into engagement with said holding means, and for giving the stem and coring tool a further advancing movement after the fruit is held by the holding means to cause the coring tool to penetrate the fruit, and means for rotating the stem to core the fruit, said coring tool being expansible, an actuator mounted on the carriage for expanding the coring tool, and relatively fixed means on the frame for operating the actuator to expand the coring tool when it has penetrated the fruit.

16. In a fruit peeling machine, the combination of a frame, peeling mechanism, means for supporting and guiding the fruit along a line extending past the peeling mechanism, holding means for holding the fruit located beyond the peeling mechanism, a carriage guided on the frame to move substantially along the said line, a stem mounted on the carriage with its axis located substantially on said line, a coring tool carried on said stem, means for moving the stem along the axis to push the fruit into engagement with said holding means, and for giving the stem and coring tool a further advancing movement after the fruit is held by the holding means to cause the coring tool to penetrate the fruit, and means for rotating the stem to core the fruit, said coring tool having a pivotal connection with said stem and capable of moving on said pivotal connection to expand the coring tool, and automatic means operating when the carriage descends when the coring tool penetrates the fruit, to swing the coring tool laterally and rotate the same to core the fruit.

17. In a fruit peeling machine, the combination of a frame, peeling mechanism, means for supporting and guiding the fruit along a line extending past the peeling mechanism, holding means for holding the fruit located beyond the peeling mechanism, a carriage guided on the frame to move substantially along the said line, a stem mounted on the carriage with its axis located substantially on said line, a coring tool carried on said stem, means for moving the stem along the axis to push the fruit into engagement with said holding means, and for giving the stem and coring tool a further advancing movement after the fruit is held by the holding means to cause the coring tool to penetrate the fruit, and means for rotating the stem to core the fruit, said coring tool being expansible and having a laterally movable blade supported on the stem, an actuating rocker for expanding the coring tool mounted on the carriage, automatic means for actuating the rocker as the carriage descends when the coring tool has penetrated the fruit, means actuated by the rocker for moving the coring tool to expand it, and means for rotating the stem to core the fruit.

18. In a fruit peeling machine, the combination of a frame, a coring stem, a carriage supporting the stem and guided to slide on the frame so as to move the stem to and fro longitudinally along a line passing through the axis of the stem, means for engaging the outer side of the fruit to support the same in a substantially fixed position with its axis located on said line, an expansible coring tool carried on the stem, means for moving the carriage toward the fruit to cause the coring tool to penetrate the same, and means for rotating the coring tool to core the fruit.

19. In a fruit peeling machine, the combination of a frame, a coring stem, a carriage supporting the stem and guided to slide on the frame so as to move the stem to and fro longitudinally along a line passing through the axis of the stem, means for supporting the fruit in a substantially fixed position with its axis located on said line, a collar slidably mounted on the stem, an expansible coring tool carried on the stem, means for moving the carriage toward the fruit to cause the coring tool to penetrate the same, means for moving the collar on the stem, said coring tool and said collar having a connection operating to expand the coring tool when the collar is moved, and means for rotating the coring tool to core the fruit.

20. In a fruit peeling machine, the combination of a frame, a coring stem, a carriage supporting the stem and guided to slide on the frame so as to move the stem to and fro longitudinally along a line passing through the axis of the stem, means for supporting the fruit in a substantially fixed position with its axis located on said line, a coring tool movably mounted on the stem and capable of swinging laterally at its lower end, a collar mounted to slide on the stem, said collar and said coring tool having a connection operating to swing the coring tool to expand it when the collar is moved, means for moving the carriage toward the fruit to cause the coring tool to penetrate the same, and means for actuating the coring tool to core the fruit.

21. In a fruit peeling machine, the combination of a frame, a coring stem, a carriage supporting the stem and guided to slide on the frame so as to move the stem to and fro longitudinally along a line passing through the axis of the stem, means for supporting the fruit in a substantially fixed position with its axis located on said line, a coring tool pivotally attached to the said stem so as to enable the lower end of the coring tool to swing laterally, a collar mounted to slide on the stem and having a pair of inclined slots at diametrically opposite points, pins on said coring tool engaging the slots so that when the collar is shifted on the stem, the coring tool will swing on its pivot, means for normally holding the collar in a position to hold the coring tool in its unexpanded position, means for moving the carriage toward the fruit to cause the coring tool to penetrate the same, and automatic means for moving the collar to expand the coring tool.

22. In a fruit peeling machine, the combination of a frame, a coring stem, a carriage supporting the stem and guided to slide on the frame so as to move the stem to and fro longitudinally along a line passing through the axis of the stem, means for supporting the fruit in a substantially fixed position with its axis located on said line, an expansible coring tool in the form of a bar pivotally mounted on the stem, extending longitudinally with the stem and having pins projecting laterally from it above its pivotal connection, a collar mounted to slide on the stem and having inclined slots engaging the said pins so that when the collar is moved along the stem the lower end of the coring tool will be swung laterally to expand the tool, means for moving the carriage toward the fruit to cause the coring tool to penetrate the same, a rocker mounted on the carriage and connected with the collar to move the same longitudinally on the stem, and a relatively fixed cam operating when the carriage is moved forward to shove the coring tool into the fruit, to move the rocker and thereby expand the coring tool.

23. In a fruit peeling machine, the combination of a frame, a coring stem, a carriage supporting the stem and guided to slide on the frame so as to move the stem to and fro longitudinally along a line passing through the axis of the stem, means for supporting the fruit in a substantially fixed position with its axis located on said line, an expansible coring tool in the form of a bar pivotally mounted on the stem, extending longitudinally with the stem and having pins projecting laterally from it above its pivotal connection, a collar mounted to slide on the stem and having inclined slots engaging the said pins so that when the collar is moved along the stem the lower end of the coring tool will be swung laterally to expand the tool, means for moving the carriage toward the fruit to cause the coring tool to penetrate the same, a rocker mounted on the carriage and connected with the collar to move the same longitudinally on the stem, and a relatively fixed cam operating when the carriage is moved forward to shove the coring tool into the fruit, to move the rocker and thereby expand the coring tool, and automatic means for rotating the said stem.

24. In a fruit peeling machine, the combination of peeling-mechanism, pusher means for engaging and advancing the fruit along a line extending toward the peeling mechanism, guide-jaws for guiding the fruit as it advances, disposed on opposite sides of said line of advance of the fruit, resilient means for pressing the guide-jaws against the side of the fruit, and guiding it as it advances past the jaws, and means connecting the guide-jaws for maintaining them equidistant from the said line, to maintain the fruit in line with said pusher means, and centered on said line as it advances.

25. In a fruit peeling machine, the combination of peeling-mechanism, pusher means for engaging and advancing the fruit along a line extending toward the peeling-mechanism, pivotally mounted guide-jaws for guiding the fruit as it advances, disposed on opposite sides of said line of advance of the fruit, resilient means for pressing the guide-jaws against the side of the fruit and enabling the jaws to move outward as the fruit advances past them, and means connecting the guide-jaws for maintaining them equidistant from the said line, to maintain the fruit in line with said pusher means, and centered on said line as it advances.

26. In a fruit peeling machine, the combination of peeling mechanism, pusher means for engaging and advancing the fruit along a line extending toward the peeling-mechanism, pivotally mounted guide-jaws for guiding the fruit as it advances, disposed on opposite sides of said line of advance of the fruit, resilient means for urging the guide-jaws to rotate on their pivotal axes to press them against the side of the fruit as the fruit advances past the jaws, and means connecting the guide-jaws for maintaining them equidistant from the said line, to maintain the fruit in line with said pusher means, and centered on said line as it advances.

27. In a fruit peeling machine, the combination of peeling-mechanism, pusher means for engaging and advancing the fruit along a line extending toward the peeling-mechanism a pair of guide-jaws for engaging and guiding the fruit as it is advanced by the pusher means, said jaws having arms for supporting the same, means for supporting said arms to rotate on relatively fixed axes to enable the jaws to swing toward or from each other, resilient means for yieldingly pressing the guide-jaws against the side of the fruit, and means connecting the jaws for maintaining them equidistant from the said line, to enable the guide jaws to maintain the fruit in line with said pusher means, and centered on said line as it advances past the jaws.

28. In a fruit peeling machine, the combination of peeling-mechanism, pusher means for engaging and advancing the fruit along a line extending toward the peeling-mechanism, guide jaws for engaging and guiding the fruit as it is advanced by said pusher means, said jaws having supporting arms, means for mounting said supporting arms to rotate on relatively fixed pivotal axes to enable the guide-jaws to swing toward or from each other to engage the side of the fruit yieldingly as the fruit advances past the jaws, a spring for drawing the guide-jaws toward each other to hold the same against the side of the fruit, and segments carried on said arms respectively meshing together to maintain the jaws equidistant from the said line, and operating to maintain the fruit in line with said pusher means, and centered on said line as it advances past the jaws.

29. In a fruit peeling machine for peeling elongated fruit, the combination of peeling mechanism, means for advancing the fruit along a line extending past the peeling mechanism, guiding and holding means for engaging the fruit to guide the same along the said line when passing toward the peeling mechanism, guiding and holding means for engaging and holding the fruit located beyond the peeling mechanism, and cooperating with the peeling mechanism to peel the upper end of the fruit.

30. In a fruit peeling machine for peeling elongated fruit, the combination of peeling mechanism, means for advancing the fruit along a line extending past the peeling mechanism, guiding and holding means for engaging the fruit to guide the same along the said line when passing toward the peeling mechanism, guiding and holding means for engaging and holding the fruit located beyond the peeling mechanism, and means for depressing the last named guiding and holding means at the end of the peeling operation to enable the peeling mechanism to peel the upper end of the fruit.

31. In a fruit peeling machine for peeling elongated fruit, the combination of peeling mechanism, a movable stem for advancing the fruit along a line extending past the peeling mechanism, guiding and holding means for engaging the fruit to guide the same along the said line, guiding and holding means beyond the peeling mechanism for engaging and holding the fruit, means for advancing the stem to move the fruit past the peeling mechanism and operating to withdraw after the fruit is in contact with the last named guiding and holding means, and means for depressing the last named guiding and holding means to permit the peeling mechanism to peel the upper end of the fruit.

32. In a fruit peeling machine for peeling pears and the like, the combination of peeling mechanism, a stem for advancing the fruit along a line extending past the peeling mechanism, upper guiding and holding means for engaging the fruit to guide the same along the said line and cooperating with the peeling mechanism to peel the lower portion of the fruit, lower guiding and holding means for engaging and holding the lower portion of the fruit, means for advancing the stem, and withdrawing the same after the lower portion of the fruit has been peeled, and means for depressing the lower guiding and holding means thereafter to permit the peeling mechanism to peel the upper end of the fruit.

33. In a fruit peeling machine for peeling elongated fruit, the combination of peeling mechanism, a movable stem for advancing the fruit along a line extending past the peeling mechanism, upper guiding and holding means for engaging the fruit to guide the same along the said line as the fruit passes into position to be peeled and cooperating with the peeling mechanism to peel the lower portion of the fruit, lower guiding and holding means for engaging and holding the lower portion of the fruit, actuating means for said stem for advancing the same to advance the fruit and operating while the fruit is held by the lower guiding and holding means to advance into the fruit to core the same and withdraw thereafter, and means for actuating the lower guiding and holding means thereafter to depress the fruit and permit the peeling mechanism to peel the upper end of the fruit.

34. In a fruit peeling machine for peeling pears and the like, the combination of peeling mechanism, a stem for engaging the fruit to advance the same along an axial line extending past the peeling mechanism, a coring tool carried by said stem, upper guiding and holding means for engaging the fruit to guide the same along the said axial line and cooperating with the peeling mechanism to peel the lower portion of the fruit, lower guiding and holding means including a central plate located on the said line having means on its faces for engaging the fruit and pressure jaws for pressing the sides of the fruit against the said plate, actuating means for said stem operating to advance the stem into the fruit, means for rotating the stem to core the fruit, and means for depressing the said plate thereafter to permit the peeling mechanism to peel the upper end of the fruit.

35. In a fruit peeling machine for peeling pears and the like, the combination of peeling mechanism, a stem for engaging the fruit to advance the same along an axial line extending past the peeling mechanism, a coring tool carried by said stem, upper guiding and holding means for engaging the fruit to guide the same along the said axial line and cooperating with the peeling mechanism to peel the lower portion of the fruit, lower guiding and holding means including a central plate located on the said line having means on its faces for engaging the fruit and pressure jaws for pressing the sides of the fruit against the said plate, actuating means for said stem operating to advance the stem into the fruit, means for rotating the stem to core the fruit, and means for depressing the said plate thereafter to permit the peeling mechanism to peel the upper end of the fruit, means for pivotally supporting the presser jaws, and automatic means for controlling the position of the same.

36. In a fruit peeling machine for peeling pears and the like, the combination of peeling mechanism, a stem for engaging the fruit to advance the same along an axial line extending past the peeling mechanism, a coring tool carried by said stem, upper guiding and holding means for engaging the fruit to guide the same along the said axial line and cooperating with the peeling mechanism to peel the lower portion of the fruit, lower guiding and holding means including a central plate located on the said line having means on its faces for engaging the fruit and pressure jaws for pressing the sides of the fruit against the said plate, actuating means for said stem operating to advance the stem into the fruit, means for rotating the stem to core the fruit, and means for depressing the said plate thereafter to permit the peeling mechanism to peel the upper end of the fruit, means for pivotally supporting said presser jaws, resilient means for urging said presser jaws toward the said plate, and automatic means cooperating with the resilient means to control the movements of the presser jaws toward or from the said plate.

37. In a fruit peeling machine, the combination of rotary peeling mechanism, means for advancing the fruit along a line coinciding with the axis of the fruit and with the axis of the peeling mechanism, guiding and holding means beyond the peeling mechanism including a center plate located on the said line so as to engage the fruit at its axis as the fruit passes, said holding means including a pair of presser jaws located on opposite sides of the center-plate for pressing the fruit against the center plate, means for guiding the center-plate to move along the said line, and automatic means for depressing the center plate to depress the fruit and permit the peeling mechanism to remove the peel at the upper end of the fruit.

38. In a fruit peeling machine for peeling pears and the like, the combination of a relatively fixed cylindrical sleeve disposed with its longitudinal axis in a vertical position, rotary peeling mechanism disposed above the sleeve, upper guiding and holding means for guiding the fruit down along the said axis, means for moving the fruit down past the peeling mechanism, lower guiding and holding means for the fruit disposed within the sleeve including a center plate with means for engaging the fruit, guided to move vertically in the sleeve and presser jaws on opposite sides of the center plate for clamping the sides of the fruit against the same, and automatic means for depressing the center plate to hold the fruit in a depressed position to permit the peeling mechanism to peel the upper end of the fruit.

39. In a fruit peeling machine for peeling elongated fruit, the combination of peeling mechanism, guiding and holding means for the fruit beyond the peeling mechanism including a center plate for engaging the fruit and presser jaws at the sides of the same, a pusher for engaging the end of the fruit to move the same past the peeling mechanism, and on to said centering plate with the axis of the fruit coinciding with the plane of the plate, means for controlling the movements of the pusher, operating to withdraw the same, and means for depressing the plate to enable the peeling mechanism to peel the upper end of the fruit after the pusher has withdrawn.

40. In a fruit peeling machine, the combination of peeling mechanism, means for advancing the fruit along a line past the peeling mechanism, a center plate located on the said line beyond the peeling mechanism operating to pass through the fruit on the axis of the fruit and having means for engaging the fruit, means for guiding the center plate to move up and down, and automatic means for lowering the center plate to depress the fruit to enable the peeling mechanism to peel the upper end of the fruit.

41. In a fruit peeling machine, the combination of peeling mechanism, means for moving the fruit along a line extending past the peeling mechanism, a center plate located on the said line, so as to lie on the axis of the fruit as the fruit passes it, said center plate having projections on its side faces for engaging the fruit and enabling the center plate when moved, to move the fruit with it in the direction in which the fruit passes along said line.

42. In a fruit peeling machine, the combination of a rotary carriage, means for supporting the fruit on the carriage, peeling knives mounted on the carriage, and a cam mounted on the carriage and rotating at a different speed from the rotary carriage for controlling the peeling knives.

43. In a fruit peeling machine, the combination of a rotary-table, a rotary-carriage mounted on the table, holding and guiding means for the fruit on the rotary-carriage, peeling-knives mounted on the carriage, a cam mounted on the carriage for controlling the peeling knives means for driving the cams at a different speed from the rotary-carriage and relatively-fixed means lying adjacent to the path of the carriage as the rotary table rotates for controlling the said holding and guiding means.

44. In a fruit peeling machine, the combination of a frame, a rotary-table mounted on the frame, a plurality of rotary carriages rotatably mounted on the rotary-table, holding and guiding means for the fruit corresponding to each carriage, peeling knives mounted on each carriage, automatic means for advancing the fruit past the knives as the rotary table rotates, a cam mounted on each carriage to rotate on the axis of rotation of the carriage, means for driving the cam at a different speed from the rotary carriage means actuated by the cam for controlling the peeling knives, and means carried on the frame for controlling the holding and guiding means.

45. In a fruit peeling machine, the combination of a rotary table, a plurality of rotary carriages mounted to rotate on the table, holding and guiding means corresponding to each carriage, peeling knives mounted on each carriage, feeding means for advancing the fruit past the peeling knives on the axis of the rotary carriage, a cam mounted on each carriage to rotate on the axis of rotation of the carriage, means for driving the said cam at a different speed from the rotary carriage, means for controlling the peeling knives from the said cam, and relatively fixed means near the path of movement of the carriages as the table rotates for controlling the said holding and guiding means.

46. In a fruit peeling machine, the combination of a rotary table, a rotary carriage mounted to rotate on the table, a pair of peeling knives pivotally mounted on the carriage so as to swing toward and from the axis of the carriage, a cam mounted to rotate on the carriage and about its axis, and means on the carriage engaging the said cam for controlling the position of the peeling knives on their pivotal axes.

47. In a fruit peeling machine, the combination of a rotary table, a rotary carriage mounted to rotate on the table, a pair of knife-arms having pivots respectively supporting the same on the carriage so as to enable the arms to swing toward or from the axis of the carriage in peeling the fruit, a cam mounted to rotate on the carriage and around the axis of the carriage, automatic means for driving the cam at a different speed of rotation from the carriage, and means on the carriage for controlling the position of the knife-arms from the cam.

48. In a machine of the kind described, a frame, a coring stem, a carriage supporting the stem and guided to slide on a line so as to move the stem to and fro longitudinally along a line passing through the axis of the stem, means for supporting the fruit in a substantially fixed position with its axis located on said line, means for moving the carriage toward the fruit to cause the coring tool to penetrate the same, and an automatically closing clutch operating when the carriage moves toward the fruit to rotate the stem when the coring tool has penetrated the fruit.

49. In a machine of the kind described, a frame, a coring stem, a carriage supporting the stem and guided to slide on a line so as to move the stem to and fro longitudinally along a line passing through the axis of the stem, means for supporting the fruit in a substantially fixed position with its axis located on said line, means for moving the carriage toward the fruit to cause the coring tool to penetrate the same, a continuously driven clutch member supported on the frame, and a clutch member carried on said stem to engage with the same when the carriage moves toward the fruit to cause the coring tool to rotate when it has penetrated the fruit.

50. In a machine of the kind described, a frame, a coring stem, a carriage supporting the stem and guided to slide on a line so as to move the stem to and fro longitudinally along a line passing through the axis of the stem, means for supporting the fruit in a substantially fixed position with its axis located on said line, means for moving the carriage toward the fruit to cause the coring tool to penetrate the same, a continuously driven clutch member mounted on the frame and having a sliding connection with said stem, a driven clutch member slidably mounted on the stem and having a driving connection with the stem to enable the driven clutch member to rotate the stem, said driven clutch member operating to engage the driving clutch member when the carriage moves toward the fruit, to cause the coring tool to rotate when it has penetrated the fruit.

51. In a machine of the kind described, a frame, a coring stem, a carriage supporting the stem and guided to slide on the stem so as to move the stem to and fro longitudinally along a line passing through the axis of the stem, means for supporting the fruit in a substantially fixed position with its axis located on said line, means for moving the carriage toward the fruit to cause the coring tool to penetrate the same, a continuously driven clutch member supported on the frame and rotatably mounted on said stem, a driven clutch member slidably mounted on the stem and having a spline connection with the stem to enable it to rotate the stem when it is in contact with the driving clutch member, said driven clutch member operating to engage the driving clutch member when the carriage moves toward the fruit, to cause the coring tool to rotate after the same has penetrated the fruit.

52. In a machine of the kind described, a frame, a coring stem, a carriage supporting the stem and guided to slide on a line so as to move the stem to and fro longitudinally along a line passing through the axis of the stem, means for supporting the fruit in a substantially fixed position with its axis located on said line, means for moving the carriage toward the fruit to cause the coring tool to penetrate the same, a continuously driven clutch member supported on the frame and rotatably mounted on said stem, a driven clutch member having a spline connection with the stem, said stem having a shoulder limiting the movement of the driven clutch member on the stem in the direction of the driving clutch member, a spring associated with the driven clutch member for normally holding the same on said shoulder, said driven clutch member operating to engage the driving clutch member when the carriage moves toward the fruit, to cause the coring tool to rotate after the same penetrated the fruit.

53. In a fruit peeling machine, the combination of holding and guiding means for the fruit, peeling mechanism for peeling the fruit, a pusher consisting of a stem mounted to advance along the longitudinal axis of the fruit having a foot at its forward end for engaging the fruit and shoving it forwardly past the peeling mechanism, said stem having a construction enabling the same to operate as a coring tool, means for holding the fruit after it has passed the peeling mechanism so as to prevent the pusher stem from advancing the fruit further and enabling the pusher stem when it advances to pass into the fruit, and means for rotating the stem thereafter to core the fruit.

54. In a fruit peeling machine, the combination of holding and guiding means for the fruit, means for advancing the fruit along a line passing through its own axis past the holding and guiding means, peeling mechanism, a stem having a coring cutter, means for producing relative movement of the stem and fruit along the axis of the fruit while the fruit is held by said holding means, thereby moving the stem relatively to the holding means to bring the coring cutter substantially to the center of the fruit, and means for rotating the coring cutter and for controlling the holding and guiding means independently of the coring cutter to hold the fruit while the coring cutter is in operation.

55. In a fruit peeling machine, the combination of holding and guiding means for the fruit, a coring tool in the form of a stem guided to move longitudinally along the axis of the fruit for engaging the fruit to push the same through the holding and guiding means, peeling mechanism cooperating with the stem and the holding and guiding means to peel the fruit, and automatic means operating thereafter for effecting the holding of the fruit against further advance by the pusher stem, and means operating thereafter to advance the stem into the fruit and for rotating the stem thereafter to core the fruit.

Signed at San Francisco, California, this 6th day of August, 1928.

HJALMAR GORANSON.
DAVID GORANSON.